United States Patent [19]

Cadeddu

[11] Patent Number: 4,815,293

[45] Date of Patent: Mar. 28, 1989

[54] SPRINGS FOR CONSTANT ABUTMENT PUSH ROD AND MASTER CYLINDER PISTON IN BRAKE BOOSTER ASSEMBLY

[75] Inventor: Leonardo Cadeddu, Crema, Italy

[73] Assignee: Bendix Italia S.p.A., Crema, Italy

[21] Appl. No.: 188,714

[22] Filed: Apr. 29, 1988

Related U.S. Application Data

[63] Continuation of Ser. No. 15,265, Feb. 17, 1987, abandoned.

[30] Foreign Application Priority Data

Feb. 18, 1986 [IT]   Italy .................................. 19448 A/86

[51] Int. Cl.$^4$ .......................... F16J 1/10; B60T 13/46; B60T 11/18
[52] U.S. Cl. ...................................... 60/547.1; 92/13.8; 92/129
[58] Field of Search ....................... 60/547.1, 562, 568, 60/593; 92/13.3, 13.51, 13.7, 13.8, 62, 63, 130 D, 129; 91/369.1, 369.2, 376 R

[56] References Cited

U.S. PATENT DOCUMENTS

| | | | |
|---|---|---|---|
| 2,873,724 | 2/1959 | Olnhausen | 60/547.1 |
| 3,100,379 | 8/1963 | Price | 92/62 |
| 4,201,057 | 5/1980 | Martin | 92/129 X |
| 4,227,371 | 10/1980 | Takeuchi | 60/547.1 |
| 4,270,355 | 6/1981 | Green | 60/593 |
| 4,307,570 | 12/1981 | Yardley | 60/547.1 |
| 4,453,452 | 6/1984 | Meynier | 91/376 R |
| 4,505,114 | 3/1985 | Haar | 60/547.1 |

*Primary Examiner*—Robert E. Garrett
*Assistant Examiner*—George Kapsalas
*Attorney, Agent, or Firm*—Larry J. Palguta; Ken C. Decker

[57] ABSTRACT

A vacuum brake booster and hydraulic master cylinder arrangement with lost-motion-eliminating abutment between the vacuum booster push rod and the master cylinder piston. The vacuum booster has an input rod, a valve, a power piston, and an adjustable length output push rod. A first spring biases the power piston to the rest position but exerts a force less than the counterforce exerted by atmospheric pressure on the input side portion of the power piston extending from the booster housing. A second spring urges the cylinder piston into contact with the push rod. This second spring is stronger than the first spring so that when vacuum is applied in the rest position the action of the two springs exerts a net force sufficient to balance the force exerted on the power piston exterior by atmospheric pressure and also maintains the push rod in constant contact with the master cylinder piston to minimize the overall actuation lost stroke of the assembly.

4 Claims, 2 Drawing Sheets

FIG_1

SPRINGS FOR CONSTANT ABUTMENT PUSH ROD AND MASTER CYLINDER PISTON IN BRAKE BOOSTER ASSEMBLY

This is a continuation of abandoned application Ser. No. 015,265 filed Feb. 17, 1987.

BACKGROUND OF THE INVENTION

1. Field of the Invention

The present invention relates to a vacuum brake booster assembly for automotive vehicles.

2. Description of the Prior Art

The majority of vacuum brake boosters have the inherent problem that the dead stroke, i.e. the movement of the brake pedal experienced by the vehicle driver before any braking force is produced, is unacceptably long. Various modifications and methods of adjustment have been proposed to reduce the dead stroke. However in many cases a limited dead stroke remains which is attributable to the distance, in the rest position of the assembly, between the end of the booster output rod and the adjacent end of the master cylinder piston. This dead stroke arises from the need to take into account the maximum possible combination of manufacturing tolerances for both the master cylinder and the booster in order to be sure that the push rod does not touch the master cylinder piston when assembled and in the rest position.

SUMMARY OF THE INVENTION

It is therefore an object of the present invention to provide a vacuum brake booster assembly in which the above described dead stroke is minimized.

According to the invention there is provided a vacuum brake booster assembly as claimed.

BRIEF DESCRIPTION OF THE DRAWINGS

The present invention will now be described by way of example with reference to the accompanying drawings in which.

DETAILED DESCRIPTION OF THE PREFERRED EMBODIMENT

Figure 1:
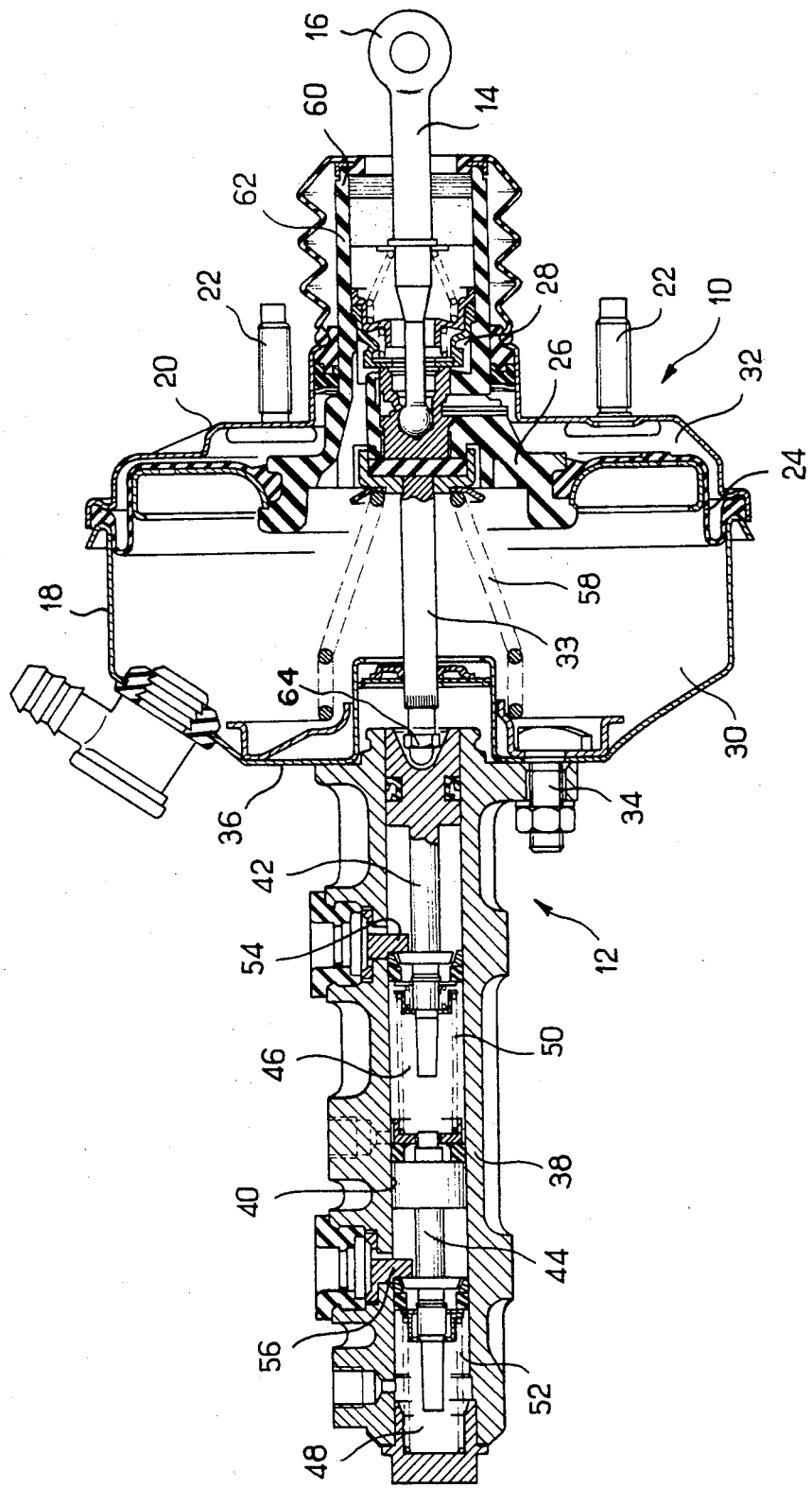
FIG. 1 is a longitudinal section through a vacuum brake booster assembly, in accordance with the invention, when in its rest position.

As shown in FIG. 1 a vacuum brake booster assembly comprises a vacuum booster, shown generally 10 and a master cylinder 12 which, in the example shown is a tandem master cylinder. The booster includes an input rod 14 intended to be connected to a vehicle brake pedal (not shown) by an eye 16. A booster housing is formed by a first shell 18 and a second shell 20 on which are mounted retaining bolts 22 for securing the booster to a vehicle fire-wall (not shown). The first and second shells together support a flexible diaphragm 24 which is connected to a plastic piston 26 which, in turn, is linked to a valve assembly 28. The diaphragm 24 and the plastic piston 26 separate the interior of the housing into first and second chambers 30 and 32. An output push rod 33 is mounted on the plastic piston 26.

The master cylinder 12 is mounted on the first shell 18 by means of bolts 34 (only one of which is shown). It should be noted that the master cylinder does not project more than a nominal distance into the housing but rather is of the type where the end plane of the master cylinder is closely adjacent the end wall 36 of the first shell 18.

The master cylinder 12 comprises a body 38 enclosing a bore 40 in which are slideably mounted primary and secondary piston assemblies 42, 44. Each piston assembly defines with the bore 40 a respective chamber 46, 48 each of which is associated with a respective vehicle braking circuit (not shown). Each piston assembly 42, 44 has a respective return spring 50, 52 to urge the pistons back into their rest position in which each abuts a respective stop 54, 56 fixedly mounted in the master cylinder body 38. The booster further comprises a return spring 58 for the plastic piston 26 which it assists to return to the rest position illustrated in FIG. 1 when the vehicle engine is switched off resulting in the presence of air in the first and second booster chambers 30, 32.

When the vehicle engine is started a vacuum is applied to the first and second booster chambers 30, 32. The atmospheric pressure acting on the annular surface 60 of a tubular extension 62 of the plastic piston 26 tends to push the plastic piston to the left (when viewing the drawings). It is this force on the plastic piston 26 which is used in the present invention to minimize the dead stroke.

In accordance with the present invention the force of spring 58 is selected to be less than the atmospheric force exerted on the annular surface 60 of the plastic piston 26 when the vehicle engine is started. Furthermore, the force of spring 50 which acts on the primary piston 42 is selected so that the comnbined forces of springs 50 and 58 are greater than the atmospheric force exerted on plastic piston 26. A typical example of the spring force is 10 Kg for spring 50 and 5 Kg for spring 58.

Figure 2:
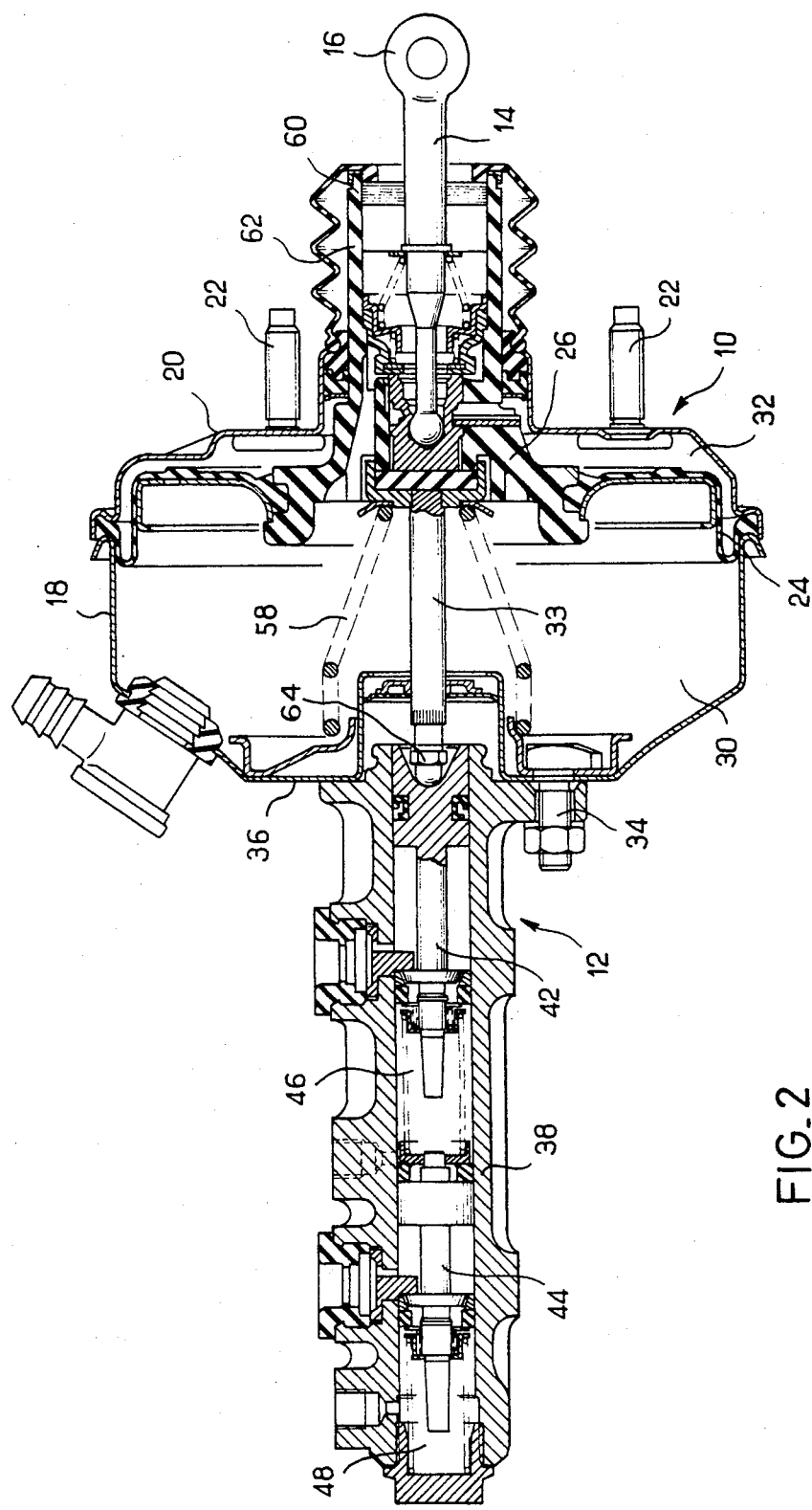
FIG. 2 is a longitudinal section of the assembly of FIG. 1 but showing its position where the dead stroke has been taken up.

Before the master-cylinder 12 is mounted on the booster 10, a screw 64 on the end of the push rod is adjusted, taking into account the combination of the possible manufacturing tolerances, to ensure that when assembled and in the rest position the end of the push-rod 33 does not touch the adjacent end of the primary piston 42. This position is shown in FIG. 1. Thus, when the vehicle engine is started and a vacuum applied to chambers 30 and 32 of the booster, the choice of the springs 50 and 58 allows the plastic piston 26 to move the left under the influence of atmospheric pressure until the end of the push rod 33 comes into contact with the primary piston 42. This position is illustrated in FIG. 2. Thus, in accordance with the present invention the dead stroke is automatically minimized as soon as the vehicle engine is started.

In order that the booster piston may be free to move forward and take up the dead stroke, the vehicle brake pedal (not shown) must not have a return spring.

It is envisaged that the present invention be also applied to a brake assembly where the master-cylinder 12 projects into the interior of the booster 10.

I claim:

1. A vacuum brake booster assembly comprising a brake booster and a hydraulic master cylinder, the booster comprising an input rod, a valve assembly and integral piston means defining first and second booster chambers in a booster housing shell, the integral piston means connected to an output rod having adjustment means to vary the length thereof, the piston means having a first spring urging the piston means toward a rest position, the master cylinder comprising at least one piston assembly associated with a respective hydraulic pressure chamber for a vehicle braking circuit, the piston assembly having a second spring urging the piston assembly toward a rest position, the piston assembly and output rod being adapted to cooperate when the brake booster assembly is in operation, characterized in that the integral piston means includes a surface subject continually to atmospheric pressure and the surface disposed exteriorly of the booster chambers and housing shell, the force exerted by the first spring on the integral piston means being less than the force exerted by atmospheric pressure on the surface of the integral piston means when vacuum is applied to the first and second booster chambers so that the atmospheric pressure displaces the integral piston means and the output rod engages the piston assembly, the combined force of the first spring acting upon the piston means and the second spring acting upon the piston assembly being greater than the force exerted by atmospheric pressure on the surface of the integral piston means so that the engagement of the output rod with the piston assembly places the booster assembly in an operative mode for the commencement of braking.

2. The vacuum brake booster assembly in accordance with claim 1, characterized in that the force of the first spring is approximately five kilogram and the force of the second spring is approximately ten kilogram.

3. The vacuum brake booster assembly in accordance with claim 2, wherein the adjustment means is operated when the output rod assembly is not in operation.

4. The vacuum brake booster assembly in accordance with claim 1, characterized in that the surface is disposed on a tubular portion of the piston means which extends rearwardly relative to the booster.

* * * * *